Nov. 8, 1949  K. H. MENG  2,487,574
CHROMATOGRAPHIC ADSORPTION
Filed Sept. 26, 1945
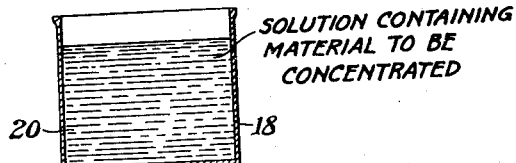
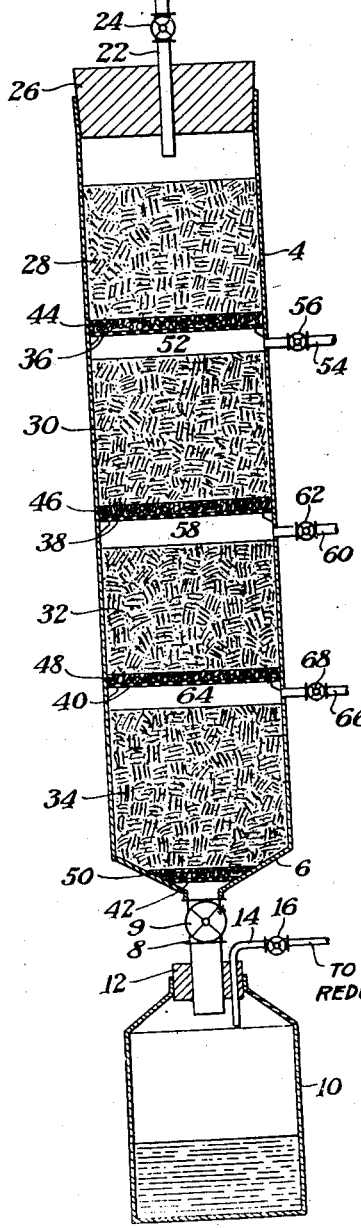
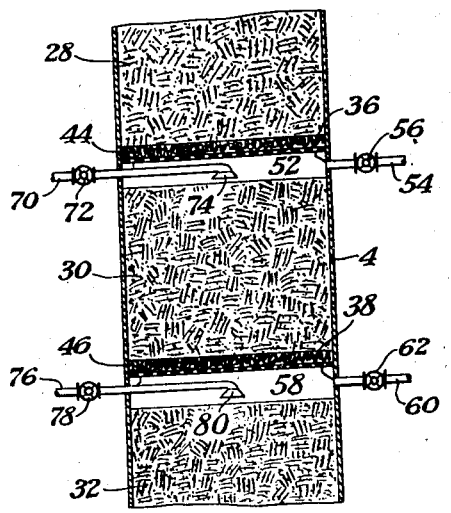
FIG. 1.
FIG. 2.
KARL H. MENG
INVENTOR
BY W. H. Cannon
ATTORNEY Patented Nov. 8, 1949

2,487,574

UNITED STATES PATENT OFFICE 2,487,574

CHROMATOGRAPHIC ADSORPTION

Karl H. Meng, Rochester, N. Y., assignor to Distillation Products, Inc., Rochester, N. Y., a corporation of Delaware Application September 26, 1945, Serial No. 618,732

4 Claims. (Cl. 210—135)

This invention relates to an improved process and apparatus for concentrating a constituent contained in a mixture of organic materials.

Concentration of constituents contained in mixtures by chromotographic adsorption is well known and several textbooks have been written on the subject. The procedure has, in the past, been used mainly in the laboratory since large scale commercial use of conventional methods has presented several serious problems. One difficulty in this connection has been the elution of the adsorbed substance from the adsorbent column. This has required passage of the eluting solvent through all the adsorbed material on the column or breaking up of the column and separate elution of the different adsorbed bands. Neither of these methods is entirely satisfactory for large scale selective separation.

This invention has for its object to avoid the above mentioned difficulties. Another object is to provide improved adsorption process and apparatus. A further object is to provide an adsorption apparatus whereby the adsorbed bands can be selectively eluted without inter-mixture and without complicated operations. Another object is to provide a simplified method of eluting adsorbed material from a series of adsorbent bands. Another object is to improve the state of the art. Other objects will appear hereinafter.

These and other objects are accomplished by my invention which includes a series of adsorbent zones with means between the zones for withdrawing liquid passing therethrough, whereby the zones can be eluted separately or in any desired order without breaking up the adsorbent zones.

In the following description I have set forth certain preferred embodiments of my invention but it is to be understood that these are given by way of illustration and not in limitation thereof.

In the accompanying drawings wherein like numbers refer to like parts I have illustrated, in Fig. 1, a vertical section of a chromatographic column embodying the features of my invention and, in Fig. 2, a fragmentary vertical section of a modification of the apparatus shown in Fig. 1 having additional means for introducing eluting liquid.

Referring to Fig. 1, numeral 4 designates a cylindrical container having a conical base 6 which terminates in a conduit 8 provided with a valve 9. Numeral 10 designates a cylindrical reservoir provided with a gas-tight stopper 12 through which conduit 8 passes. Stopper 10 is provided with a conduit 14 and valve 16 leading to a source of reduced pressure (not shown).

Numeral 18 designates a reservoir containing a solution of the organic mixture to be chromatographed, indicated by numeral 20. Reservoir 18 is provided with a withdrawal conduit 22 equipped with valve 24 which is securely held by stopper 26 mounted in the upper end of casing 4. Numerals 28, 30, 32 and 34 designate a plurality of adsorbent bodies positioned in casing 4 which are respectively supported by perforated partitions 36, 38, 40 and 42. Numerals 44, 46, 48 and 50 designate thin layers of glass wool resting upon the partitions 36, 48, 40 and 42 respectively which prevent the adsorbent from washing through. Numeral 52 designates a space intermediate the adsorbent zones 28 and 30, to which is connected a withdrawal conduit 54 provided with valve 56. Numeral 58 designates a space between adsorbent zones 30 and 32 to which is connected withdrawal conduit 60, provided with valve 62. Numeral 64 designates a space between adsorbent zones 32 and 34 to which is connected conduit 66, provided with valve 68.

Referring to Fig. 2, numeral 70 designates a conduit provided with valve 72 which is provided with a spray nozzle 74, terminating in space 52. Numeral 76 designates a conduit provided with valve 78 which is provided with a spray nozzle 80, terminating in space 58.

In operating the apparatus illustrated in Fig. 1 the organic mixture containing the constituent or constituents to be concentrated is dissolved in a suitable liquid solvent and introduced into reservoir 18. Valves 24, 9 and 16 are then opened and if a fine adsorbent is used, reduced pressure is applied to conduit 14. The solution flows in sequence through adsorbent zones 28, 30, 32 and 34 and thence into reservoir 10. Different constituents are adsorbed on different zones. Valve 9 is then closed so that the column remains full of solution. If desired this solution can first be displaced with fresh solvent. Valve 56 is then opened and eluting solvent is introduced into reservoir 18 and is permitted to flow through adsorbent zone 28. This liquid then flows out through conduit 54 and the constituent adsorbed on zone 28 can be recovered therefrom. Valve 56 is then closed and valve 62 is opened. Additional eluting liquid is introduced and flows through zone 30 and the adsorbed material contained thereon is withdrawn through conduit 60. Valve 62 is then closed and zone 32 and 34 are separately eluted, as described in connection with zone 28 and 30.

In some cases it may be undesirable to pass the eluting solvent through an adsorbent zone other than the one to be eluted even after it has been eluted and, in such case, the equipment illustrated in Fig. 2 is of particular value. The operation of this equipment is essentially the same as that described in connection with Fig. 1, except that during the eluting operation the eluting solvent is introduced through valve 72, conduit 70 and nozzle 74, in the case of zone 30, and through conduit 76, valve 78 and nozzle 80, in the case of zone 32. This eluting solvent is then withdrawn through the conduit at the base of the zone through which it has passed so that fresh eluting solvent can be passed into a particular zone without contact with other solvents. This also permits elution of the zones in any sequence desired, starting with the bottom of the column, if this is advantageous.

Many modifications can be made without departing from the spirit or scope of my invention. Placing of valves between the zones would prevent eluting solvent from flowing into a lower zone in the event that it had been eluted and drained. The adsorbent zones can be formed of any desired adsorbent and can be of equal or unequal size. If a fine adsorbent is used it may be desirable to apply reduced pressure to conduits 54, 60 and 66 at the time that the eluting solvents flow therethrough. Also, it may be desirable to supply the solution and eluting solvents to the column under pressure from reservoir 18, in which case suction or reduced pressure at conduits 54, 60, 66 and 14 would be of no advantage.

What I claim is:

1. The method of chromatographically separating and recovering the constituents of a mixture of organic materials, which method comprises dissolving the mixture in a solvent therefor, passing said mixture in said solvent through a chromatographic column of substantial length and chromatographically absorbing different constituents of said mixture in localized zones of said column, and while maintaining said column intact eluting at least one of said zones with an eluting solvent and withdrawing the eluate from said column without passing the eluting solvent through the remaining uneluted zones.

2. The method of chromatographically separating and recovering the constituents of a mixture of organic materials, which method comprises dissolving the mixture in a solvent therefor, passing said mixture in said solvent through a chromatographic column of substantial length and chromatographically adsorbing different constituents of said mixture in localized zones of said column, and thereafter separately recovering at least one of said chromatographically adsorbed constituents while maintaining said column intact by passing an eluting solvent through the zone in which said one constituent is adsorbed and withdrawing the eluate from said column immediately upon emergence from said zone being eluted without passing it through another uneluted zone.

3. The method of chromatographically separating and recovering the constituents of a mixture of organic materials, which method comprises dissolving the mixture in a solvent therefor, passing said mixture in said solvent through a chromatographic column of substantial length and chromatographically adsorbing different constituents of said mixture in separate localized zones of said column, and thereafter while maintaining said column intact introducing eluting solvent into said column at one face of a localized zone containing one said adsorbed constituent, passing the eluting solvent through said zone and withdrawing the eluate from the column immediately upon emergence from said zone.

4. The method of chromatographically separating and recovering the constituents of a mixture of organic materials, which method comprises dissolving the mixture in a solvent therefor, passing said mixture in said solvent downwardly through a chromatographic column of substantial length and chromatographically adsorbing different constituents of said mixture in different localized zones of said column, filling said column with said solvent for the mixture, maintaining the column intact, and thereafter separately and successively eluting each localized zone by introducing eluting solvent into the top of the column, passing said eluting solvent downwardly through not more than one uneluted zone and withdrawing the eluate from said column immediately upon emergence from the localized zone being eluted until substantially all of the adsorbed material in said zone is eluted.

KARL H. MENG.

REFERENCES CITED

The following references are of record in the file of this patent:

UNITED STATES PATENTS

| Number | Name | Date |
|---|---|---|
| 136,364 | Conger | Mar. 4, 1873 |
| 316,925 | Vogel | Apr. 28, 1885 |
| 388,863 | Gruber | Sept. 4, 1888 |
| 429,112 | Bowden | June 3, 1890 |
| 575,478 | Haefner | Jan. 19, 1897 |
| 590,868 | Wanner et al. | Sept. 28, 1897 |
| 1,246,850 | Best | Nov. 20, 1917 |
| 2,123,785 | Knox et al. | July 12, 1938 |
| 2,272,964 | Coe et al. | Feb. 10, 1942 |
| 2,418,837 | Houdry | Apr. 15, 1947 |

FOREIGN PATENTS

| Number | Country | Date |
|---|---|---|
| 568,269 | Great Britain | Mar. 30, 1945 |

OTHER REFERENCES

Principles and Practice of Chromatography, by Zechmeister and Cholnoby, 1941, pp. 1–4 and 64.

Chromatographic Absorption Analysis, by Harold Strain, 1942, pp. 1–7.